UNITED STATES PATENT OFFICE.

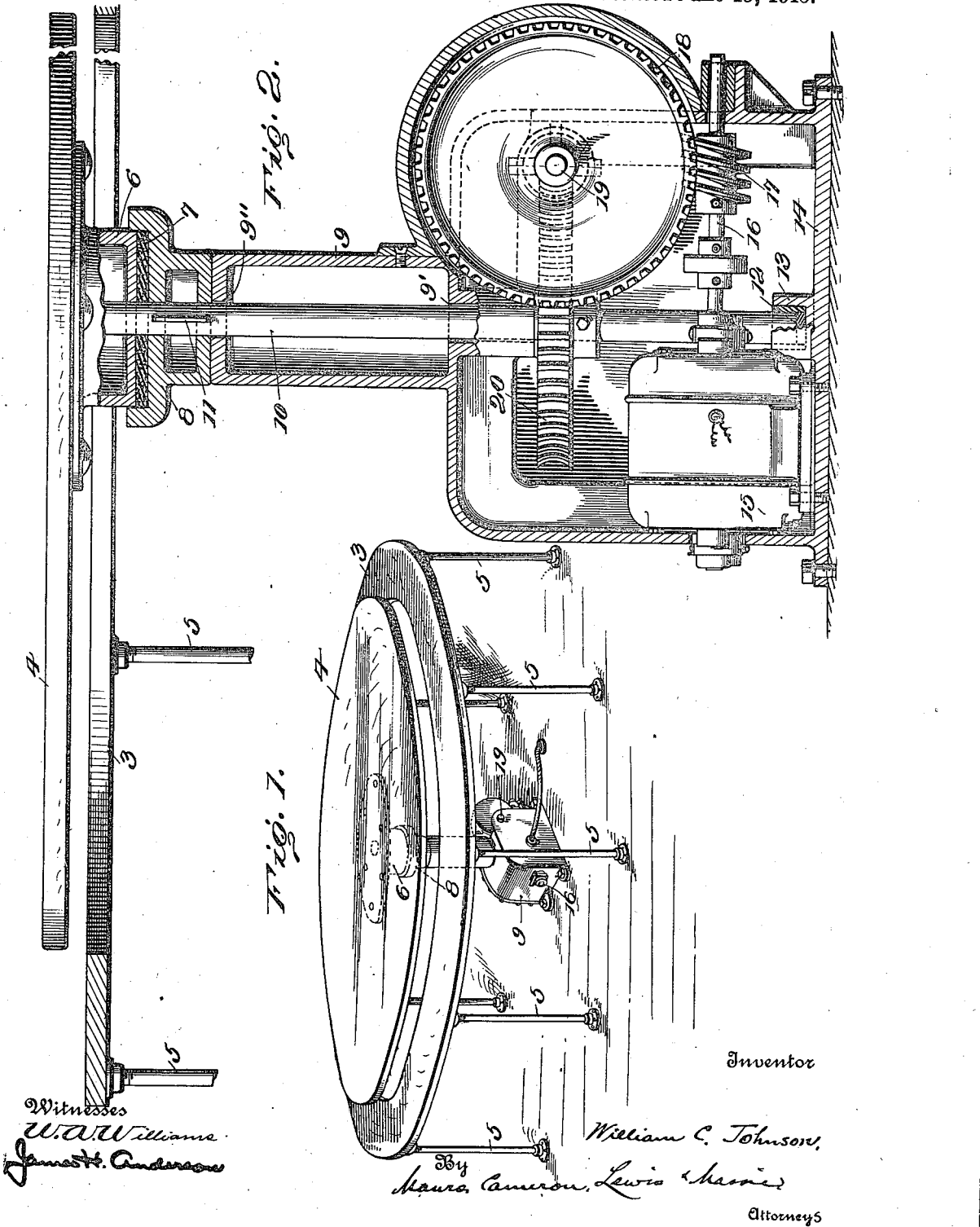

WILLIAM C. JOHNSON, OF CINCINNATI, OHIO.

TABLE.

1,143,279. Specification of Letters Patent. Patented June 15, 1915.

Application filed March 6, 1912. Serial No. 681,970.

*To all whom it may concern:*

Be it known that I, WILLIAM C. JOHNSON, of Cincinnati, Ohio, have invented a new and useful Improvement in Tables, which invention is fully set forth in the following specification.

The present invention is an improvement in tables, and, particularly, is a table comprising an outer stationary member or ring and an inner rotary disk or plate.

The table of the present invention may be used for various purposes, and is particularly adapted for use in packing candy. The method commonly in vogue of having the packer move from place to place in order to pack in a box a variety of candies is exhausting on the workers and wasteful as to time consumed. With the improved table, on the other hand, the packers may seat themselves around the stationary outer ring or rim, and supplies of candies of various kinds being placed on the inner rotary disk, and said disk revolving at a suitable speed, the candy will be brought to the packers, instead of vice versa.

The use of the table of the present invention involves a large economy in candy packing, besides obviating exhausting effort on the part of the packers, as they can work while remaining seated.

The invention will be better understood by reference to the accompanying drawings illustrating one embodiment of the inventive idea, and wherein—

Figure 1 is a perspective view showing the improved table; and Fig. 2 is a vertical sectional view, partly in elevation.

Referring to the drawings, the improved table is composed of a stationary outer rim or ring 3 and an inner rotary disk or plate 4. The rim or ring 3 is preferably supported by a number of standards or uprights 5, in order to effectively support the weight imposed thereon. The disk or plate 4 preferably rotates in a horizontal plane above that of the rim 3, so that the goods thereon may be more readily reached. To the underside of the disk or plate 4, and centrally thereof, is suitably secured, as by bolts, a flanged projection 6, which projection rests on a friction pad or washer 7, and surrounds the vertical driving shaft, hereafter referred to, but is not connected thereto. This pad or washer 7 is carried in a recess in a bearing member 8, which bearing member is mounted on the base or frame 9 of the machine. Said bearing member is suitably secured to a vertical shaft 10, as by a key 11, and this shaft 10 is rotated by suitable means, hereinafter described. The rotary disk or plate 4 is driven solely by reason of the connection between the bearing member 8 and said shaft, the pad or washer 7 and the flanged projection 6 not being connected to said shaft. As the bearing member 8 rotates, it carries with it the friction pad 7, which is preferably of leather, and which surrounds shaft 10, and the plate or disk 4 is thus driven by reason of the engagement of flanged projection 6 with the friction pad or washer 7. The provision of this friction drive for the disk or plate 4 is of great importance, especially when the table is being used in the packing of candy, for, should one of the operators fail to take in time the desired article, she can grasp the rotating disk 4 and stop its movement, or even rotate it by hand in the opposite direction to that in which it is being driven by the motor, without in any way stopping or affecting the driving mechanism. When the disk or plate 4 is released by the operator who has been holding the same, the friction pad 7 will promptly "pick up" the disk 4, and cause it to participate in the rotary movement of the shaft 10 and bearing member 8.

The lower end of vertical shaft 10 preferably bears on a steel plate 12, which is carried by pocket 13 secured to the base plate 14 of the base or frame 9, and said shaft 10 is steadied while rotating by passing through openings in the base or frame 9 at 9' and 9''. All of the driving mechanism, including a suitable motor 15, here shown as an electric motor, is preferably carried by the base or frame 9, so that the table and the means for driving the same can be readily moved from place to place.

The motor 15 is connected to a source of current, and suitable gearing is introduced between said motor and vertical shaft 10, so that the disk or plate 4 will be rotated at the desired speed. As here shown, on motor shaft 16 is secured a worm 17, which meshes with a gear 18, which latter is mounted on shaft 19, also carried by the base or frame 9. On this shaft 19 is mounted a worm (not shown) similar to worm 17, the worm on shaft 19 meshing with gear 20 rigidly secured to vertical shaft 10. Preferably, the frame 9 is entirely inclosed, so that accidental contact with the motor and gearing will be obviated.

It will be understood from the foregoing that the installation of the improved table requires only the placing of the stationary rim or ring 3, securing the frame 9 to the floor and connecting the motor with a source of current. Further, if, for any reason, it is desired to remove the rotating disk or plate 4, this can be effected by merely raising it, as said disk is not connected to the vertical shaft 10. In addition, the mounting of the projection 6 on bearing member 8, and the mounting of the latter on base or frame 9, relieves shaft 10 of the weight of the rotary disk or plate 4.

The improved table is compact, simple, economical and durable, and is most efficient in operation, particularly for the packing of candy, as above set forth.

What is claimed is:—

In a table, a stationary outer rim, an inner rotary disk, a driving shaft, a bearing member secured to said shaft and having a recess therein, a friction pad mounted in said recess for imparting rotation to said rotary disk, and a projection carried by said disk and extending into said recess for contacting with said pad.

In testimony whereof I have signed this specification in the presence of two subscribing witnesses.

WILLIAM C. JOHNSON.

Witnesses:
MALCOLM McAVOY,
JOHN E. MOLONEY.